T. C. JOHNSON.
REAR WINDAGE SIGHT FOR FIREARMS.
APPLICATION FILED JAN. 8, 1917.
1,257,713.
Patented Feb. 26, 1918.
3 SHEETS—SHEET 1.
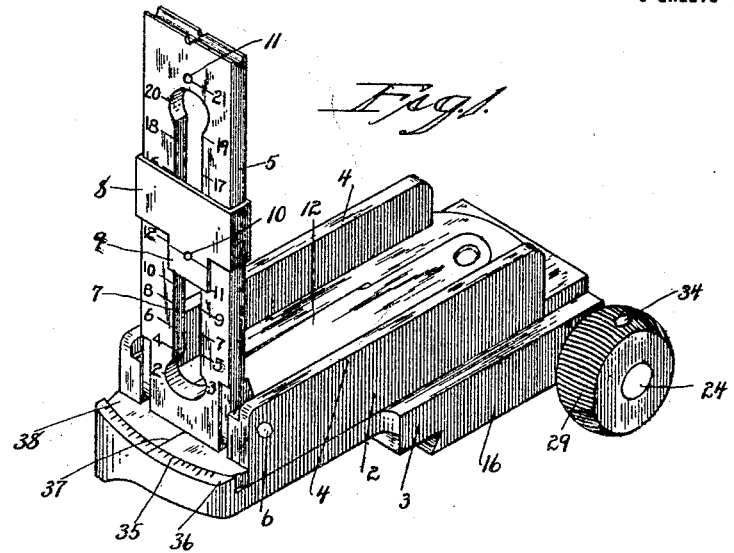
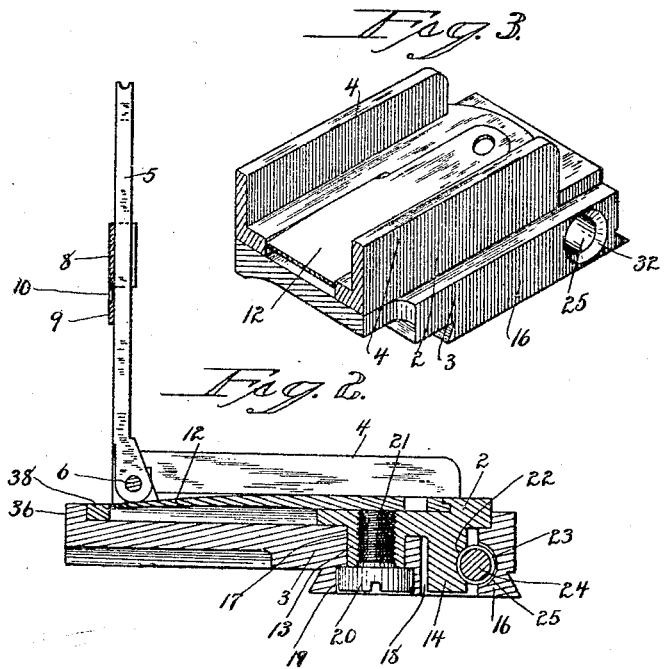
Inventor
Thomas C. Johnson
by Seymour Earle
Attys T. C. JOHNSON.
REAR WINDAGE SIGHT FOR FIREARMS.
APPLICATION FILED JAN. 8, 1917.
1,257,713.
Patented Feb. 26, 1918.
3 SHEETS—SHEET 2.
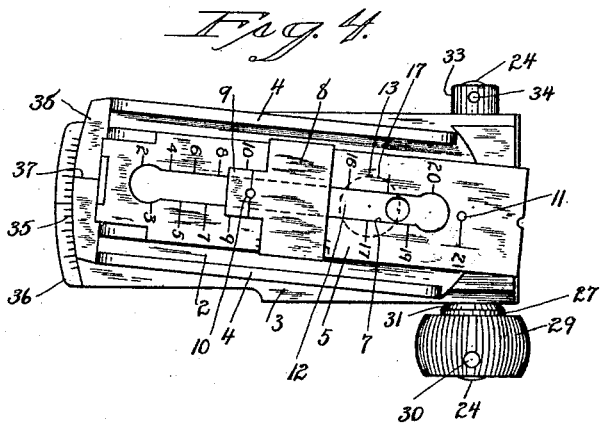
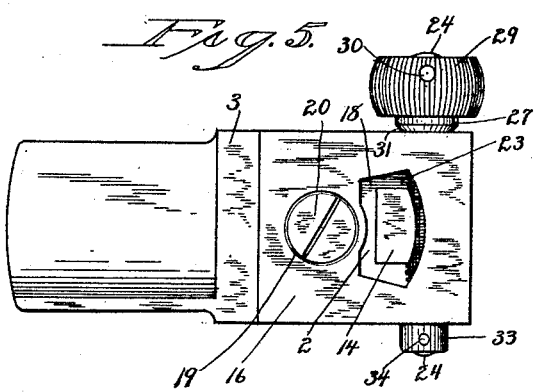
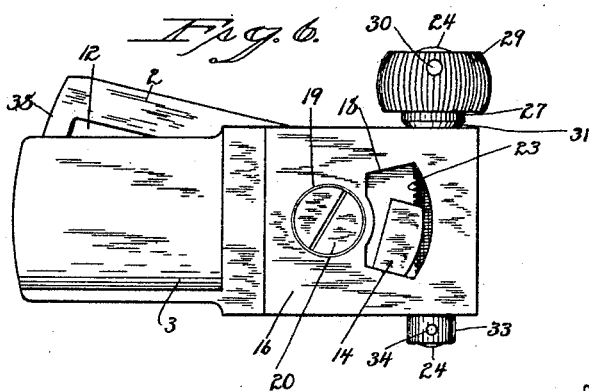

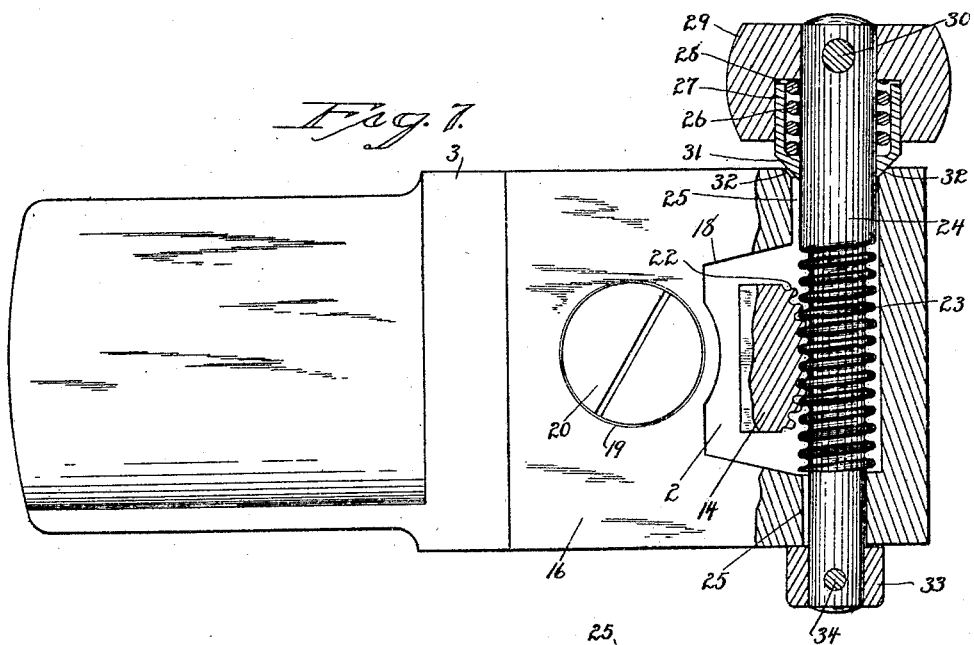
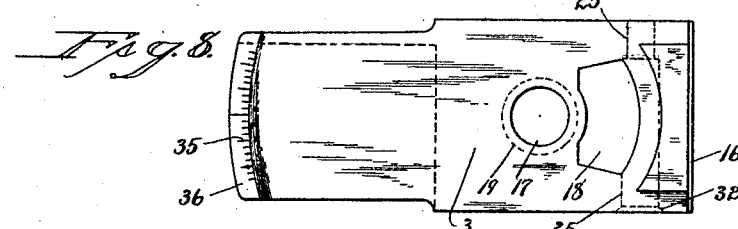
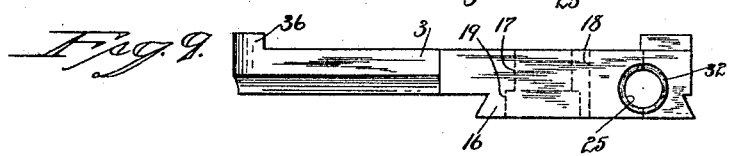
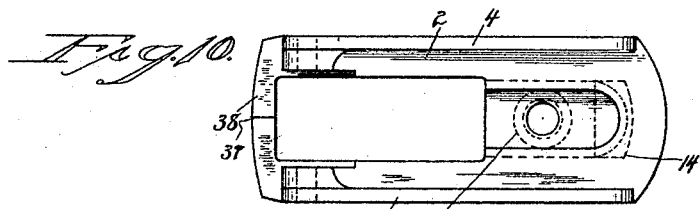
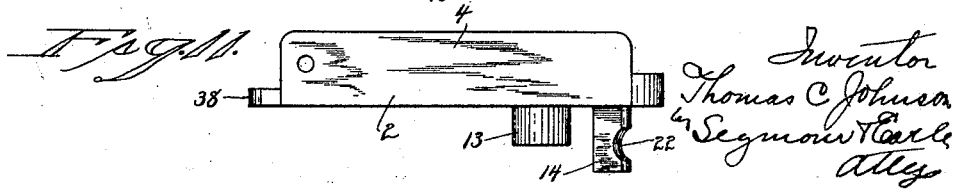

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

REAR WINDAGE-SIGHT FOR FIREARMS.

1,257,713.     Specification of Letters Patent.     Patented Feb. 26, 1918.

Application filed January 8, 1917. Serial No. 141,166.

*To all whom it may concern:*

Be it known that I, THOMAS C. JOHNSON, a citizen of the United States, residing at New Haven, in the county of New Haven and State of Connecticut, have invented a new and useful Improvement in Rear Windage-Sights for Firearms; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a rear windage-sight constructed in accordance with my invention, the pivotal sight-leaf being shown in its elevated position.

Fig. 2 a view of my improved sight in vertical central longitudinal section.

Fig. 3 a detail broken perspective view of the forward ends of the upper and lower members of the two-part sight-base.

Fig. 4 a plan view of the sight shown as adjusted to compensate for wind velocity.

Fig. 5 a reverse plan view of the sight.

Fig. 6 a reverse plan view of the sight, shown at the extreme limit of its windage-adjustment.

Fig. 7 a reverse plan view of the sight on an enlarged scale with a portion of its forward end in section.

Fig. 8 a detached plan view of the fixed lower member of the sight-base.

Fig. 9 a view thereof in side elevation.

Fig. 10 a detached plan view of the pivotal upper member of the sight-base.

Fig. 11 a view thereof in side elevation.

My invention relates to an improvement in rear windage-sights for firearms, the object being to produce a simple-compact, convenient and accurate windage-sight constructed with particular reference to its application to the top of the bolt-housing portion of the receiver of a shoulder-arm, at a point to the rear of the upwardly and laterally extending opening formed in the said bolt-housing portion of the receiver for loading the gun and the ejection of the spent cartridges therefrom.

With these ends in views, my invention consists in a rear windage-sight having certain details of construction as will be hereinafter described and pointed out in the claims.

In carrying out my invention as herein shown, I employ a two-part sight-base consisting of a pivotal upper member 2 and a fixed lower member 3, the said upper member being formed along its edges with parallel upstanding flanges 4 for the protection of the pivotal sight-leaf 5 which turns upon a pin 6 extending through its lower end and through the rear ends of the said flanges. The said leaf 5 is formed with a centrally arranged, longitudinal clearance slot 7, is provided upon its rear face with the ordinary range-graduations, and carries a slide 8 having a centrally arranged depending arm 9 formed with a peep-hole 10 which is used for all ranges except the longest range, for which a peep-hole 11 is formed directly in the sight-leaf 5 near its upper end. A flat leaf-spring 12 mounted in the pivotal base-member 2 is provided, as shown, for holding the sight-leaf 5 in its depressed and elevated positions. I do not, however, limit myself to the use of any particular sight-leaf which forms no part of my present invention which is concerned with the construction of the upper and lower sight-base members 2 and 3 and the means employed for adjusting the sight to compensate for windage.

The said upper sight-base member 2 is formed forward of its center with a depending internally tapped integral trunnion 13 and an integral worm-gear segment 14 located directly forward of the same.

The fixed or lower sight-base member 3 is formed upon the lower face of its forward end with a transversely arranged wide dovetail rib 16 which is entered into a corresponding dovetail or undercut groove, not shown, but understood to be formed in the rear end of the top of the bolt-housing portion of the receiver of the arm. Under this construction, the rear end of the sight will extend rearwardly beyond the rear end of the bolt-housing so as to overhang the same.

The said lower sight-base member 3 is formed in its forward end with a bearing-opening 17 for the reception of the trunnion 13 before mentioned, and with a segmental clearance slot 18 located in front of the said opening 17 and provided for the downward passage through it of the said worm-gear segment 14 which engaged with the side walls of the said slot to limit the oscillatory movement of the pivotal sight-base member 2. The lower base of the said member 3 is counterbored as at 19 concentric with the bearing-opening 17 for the reception of the head 20 of a screw 21 which extends upward into the tapped trunnion 13 for securing the two members of the sight base together as clearly shown in Fig. 2, and whereby the upper member 2 of the sight-base turns in the lower member 3 thereof upon the trunnion 13 within the limits prescribed by the width of the segmental slot 18.

For swinging the pivotal upper member 2 of the sight-base upon the fixed lower member 3 thereof in either direction as required to compensate for windage, the forward face of the segment 14 is formed with worm-gear teeth 22 which are engaged by a worm-gear thread 23 upon a small shaft or spindle 24 located in a transverse opening 25 formed in the extreme forward end of the fixed sight-base member 3 and intersecting the clearance-slot 18 before mentioned, the said opening 25 being located partly in the body of the member 3 and partly in the dovetail fastening-rib 16 thereof.

For taking up back-lash or play between the teeth 22 and the worm-thread 23, I employ a helical take-up spring 26 housed in a sleeve or bushing 27 the open outer end of which is entered into a concentric recess 28 formed in the inner face of the knurled operating-button 29 secured by a pin 30 to the projecting right hand end of the shaft 24 for the operation thereof. The inner end of the said sleeve is formed with a cone 31 for co-action with a conical seat 32 formed in the right hand side of the sight-base member 3 concentric with the right hand end of the transverse opening 25 therein, as clearly shown in Figs. 3, 7 and 9. The opposite or left-hand end of the shaft 24 projects through the said opening 25 for its provision with a collar 33 held in place by a pin 34. The parts just described are proportioned so that the spring 26 by exerting a constant inward thrust upon the sleeve 27 forces the conical inner end 31 thereof against the conical seat 32, whereby the shaft 24 is swung rearwardly so as to crowd its worm-thread 23 into close engagement with the worm-teeth 22 and maintain such engagement so as to eliminate all play or back-lash between the pivotal and fixed members 2 and 3 of the two-part sight base.

By turning the shaft 24 by its knurled button 29, the pivotal upper sight-base member may be swung from right to lift, or vice versa, so as to compensate for varying wind velocities. Thus Fig. 4 shows the upper member 2 swung from right to lift to compensate for a medium velocity of wind blowing from the left, while Fig. 6 shows the said member swung to the limit of its movement in the opposite direction for the maximum velocity of wind blowing from the right. These windage adjustments are gaged by means of graduations 35 formed upon a segmental shoulder 36 upturned from the rear end of the fixed sight-base member 3 and read in conjunction with a gage-mark 37 formed upon a segmental flange 38 projecting rearwardly from the rear end of the upper base sight-member 2.

I claim:—

1. In a rear windage-sight for shoulder arms, the combination with a lower sight-base member adapted at its forward end to be applied to the bolt-housing portion of the receiver of a shoulder arm and having a bearing-opening and a clearance-slot; of an upper sight-base member having at its forward end a depending trunnion entering the said opening and a depending worm-gear segment entering the said slot and co-acting with the ends thereof to limit the swinging movement of the said upper sight-base member, a worm located below the plane of the lower face of the said upper member and engaging with the said segment for swinging the said upper member to compensate for windage; and a sight-leaf carried by the said upper member, the rear ends of both of the said members being adapted to overhang and clear the rear end of the said bolt-housing portion of the receiver.

2. In a rear windage-sight for shoulder arms, the combination with a lower sight-base member adapted upon the lower face of its forward end to be applied directly to the bolt-housing portion of the receiver of a shoulder arm, of a pivotal upper sight-base member, and means located below the plane of the lower face of the said pivotal member for swinging the same to compensate for windage, the rear ends of both of the said members being adapted to overhang and clear the rear end of the said bolt-housing portion of the receiver.

3. In a rear windage-sight for shoulder arms, the combination with a lower sight-base member adapted at its forward end to be applied to the bolt-housing portion of the receiver of a shoulder arm and having a bearing-opening and a clearance-slot, of an upper sight-base member having a depending trunnion entering the said opening and a depending worm-gear segment entering the said slot, a worm located in a transverse opening formed in the forward end of the said lower member at a point below the plane of the lower face of the said upper member, the said worm engaging with the said worm-gear segment for swinging the said upper member to compensate for windage, and a sight-leaf carried by the said upper member, the rear ends of both of the said members being adapted to overhang and clear the rear end of the said bolt-housing portion of the receiver.

4. In a rear windage-sight for shoulder arms, the combination with a lower sight-base member formed upon the lower face of its forward end with a transverse dovetail rib, and also formed with a bearing-opening, with a clearance-slot passing downward through the said rib, and with a transverse worm-shaft opening located in front of the said slot; of a pivotal upper sight-base member having a depending trunnion entering the said bearing-opening and with a depending worm-gear segment passing through the said slot; a worm-shaft located in the said transverse opening and engaging with the said worm-segment for swinging the upper sight-base member to compensate for windage, and a sight-base carried by the said upper member, the rear ends of both of the said members being adapted to overhang and clear the rear end of the said bolt-housing portion of the receiver.

5. In a rear windage-sight for shoulder arms, the combination with a lower sight-base member adapted at its forward end to be applied to the bolt-housing portion of the receiver of a shoulder arm, of a pivotal upper sight-base member, one of the said members having a clearance-slot and the other a worm-gear segment entering the said slot and engaging with the ends thereof to limit the swinging movement of the said pivotal upper member, a worm located in the forward end of the said lower member and engaging with the said segment for swinging the pivotal member to compensate for windage, and a sight-leaf carried by the said upper member, the rear ends of both of the said members being adapted to overhang and clear the rear end of the said bolt-housing portion of the receiver.

6. In a rear windage-sight for shoulder arms, the combination with a two-part sight-base, comprising a fixed lower member and a pivotal upper member; of a sight-leaf carried by the said upper member, a worm-shaft mounted in the forward end of the said lower member and co-acting with corresponding teeth on the pivotal member for adjusting the same for windage, an operating button mounted upon one end of the said worm-shaft and having its inner face recessed, a bushing located in the said recess and having its inner end formed with a cone to coact with a corresponding seat in the said lower member, a helical spring located in the said bushing, and means for securing the opposite end of the shaft in place, whereby the said spring exerts a constant effort to force the said cone upon the said seat and so take up play or back-lash between the said teeth and worm-shaft.

In testimony whereof, I have signed this specification in the presence of two subscribing witnesses.

THOMAS C. JOHNSON.

Witnesses:
CLARA L. WEED,
FREDERIC C. EARLE.

Copies of this patent may be obtained for five cents each, by addressing the "Commissioner of Patents, Washington, D. C."